Aug. 22, 1961 W. RUEGGEBERG 2,997,671
DUAL LOAD TRANSMISSION SYSTEM
Filed Feb. 26, 1958 2 Sheets-Sheet 1

INVENTOR
Werner Rueggeberg

BY *[signature]*

ATTORNEY

Aug. 22, 1961  W. RUEGGEBERG  2,997,671
DUAL LOAD TRANSMISSION SYSTEM
Filed Feb. 26, 1958  2 Sheets-Sheet 2

INVENTOR
Werner Rueggeberg
BY
ATTORNEY

United States Patent Office 2,997,671
Patented Aug. 22, 1961

2,997,671
DUAL LOAD TRANSMISSION SYSTEM
Werner Rueggeberg, Lancaster, Pa., assignor to Armstrong Cork Company, Lancaster, Pa., a corporation of Pennsylvania
Filed Feb. 26, 1958, Ser. No. 717,614
12 Claims. (Cl. 333—17)

The present invention relates to radio frequency transmission systems of improved design; and is more particularly concerned with a transmission system so constructed with respect to the characteristic impedance, electrical length and switching properties of the various portions thereof, that said system may be utilized to transfer energy from a high frequency source to either one of two loads or two separate loads in tandem while presenting said high frequency source with ideal load impedances under all conditions of operation, including no-load.

It is often desired to transfer energy from a single high frequency generator or oscillator to one or more loads utilizing the energy from said single source. One particular example of such a transmission system involves the transfer of energy from a main oscillator to a plurality of applicators or electrode networks adapted to heat dielectric loads; and as a practical matter, it is ordinarily desirable to so arrange the overall system that the said loads can be spaced from one another and switched at will into or out of the system. In practice, it has often been found difficult to devise systems utilizing a single oscillator or high frequency or RF source in conjunction with dual or plural switchable loads; and this difficulty has arisen primarily from the fact that, as the number of loads actually coupled to the network output changes, the effective impedance of the overall system seen by the aforementioned generator or oscillator changes appreciably whereby the said oscillator does not see ideal loading conditions under all possible conditions of operation. Indeed, in transmission systems of types suggested heretofore wherein two switchable loads are sought to be energized by a single source, it has been found that under some conditions of operation the load seen by the oscillator or generator may readily become sufficiently reactive to introduce undesirable effects upon the oscillator operation, including frequency skipping and the like.

The present invention serves to obviate the foregoing difficulties, and is particularly concerned with an improved transmission system so constructed that a single oscillator associated, for the major part of the transmission network, with a single coaxial transmission line can be employed to energize one, both, or neither, of a pair of switchable loads such as dielectric heater loads, while simultaneously presenting the oscillator with ideal load conditions under all such possible conditions of operation. Indeed, as will become apparent from the subsequent discussion, one of the particular features of the present invention resides in the provision of a transmission network associated with a pair of switchable loads, so constructed and arranged that an oscillator feeding said network sees a purely resistive impedance of fixed and predetermined magnitude whether either one or both of two switchable loads are energized; and said oscillator, in addition, sees a substantially infinite impedance when neither of said two loads is to be energized.

It is accordingly an object of the present invention to provide an improved RF transmission network.

A further object of the present invention resides in the provision of a transmission network adapted to transfer energy from an oscillator to either one, both, or neither of two switchable loads, without adversely affecting the effective load seen by the oscillator itself.

Another object of the present invention resides in the provision of an improved plural load transmission system associated with a single source of oscillations, so constructed and arranged that said source is presented with ideal load impedances under all possible conditions of operation, including no-load operation.

Still another object of the present invention resides in the provision of improved dielectric heater arrangements employing a pair of switchable dielectric loads energized by a single source of oscillations.

A further object of the present invention resides in the provision of an improved control arrangement associated with a transmission system for transferring energy from a high frequency source to one or more loads, so constructed and arranged that automatic control of the loads energized as well as of the effective impedance seen by said source can be effected.

Still another object of the present invention resides in the provision of an improved generating and transmission system utilizing automatic control of the generator output power whereby the power level of said generator is automatically varied in accordance with load requirements.

A still further object of the present invention resides in the provision of an improved transmission network including improved RF power switching arrangements adapted to couple selected ones of plural loads to a common source of energization.

Still another object of the present invention resides in the provision of a transmission line of appropriate electrical length, so associated with compensating impedances and dual switchable loads that an oscillator feeding said overall system sees a purely resistive impedance under all possible loaded conditions, and sees an essentially infinite impedance under no-load conditions thereby to assure improved operation of said oscillator under all possible operating conditions.

In effecting the foregoing objects and advantages, the present invention contemplates the provision of an improved transmission network coupling a single source of high frequency or RF oscillations to a plurality of switchable loads. The loads themselves may comprise, as mentioned previously, heating applicators or electrode systems for the dielectric heating of work pieces; and the said loads may, in accordance with one feature of the present invention, be switched into or out of the network by improved RF power switches utilizing a pair of coils movable relative to one another under the control of air cylinder or other pneumatic actuators. The loads themselves can be independently switched into or out of the circuit thereby permitting a greater facility of operation than has been possible heretofore; and the overall system is so arranged that it is adapted to respond to the actual load conditions selected at a plurality of load points through actuation of the aforementioned switches to assure that a single oscillator energizing the selected loads sees an ideal load impedance under all possible conditions of operation.

In particular, the said oscillator or generator may be coupled to the aforementioned switches by means of a high frequency transmission line of particular electrical length; and this line may also be associated with a compensating reactance, preferably a variable inductance, the magnitude of which reactance is automatically changed, with corresponding changes in load condition, to assure that the oscillator or generator sees a purely resistive load impedance of predetermined magnitude when one or more of the aforementioned loads are in the circuit; and sees an essentially infinite load impedance when all of the loads are deenergized. In accordance with a further feature of the present invention, moreover, means are provided for automatically controlling the power level of the aforementioned oscillator or generator whereby a switching in the number of loads being energized effects a corresponding control over the oscillator power level to assure that the actual power output of the oscillator or generator corresponds to load requirements under all possible conditions of operation.

The foregoing objects, advantages, construction and operation of the present invention will become more readily apparent from the following description and accompanying drawings, in which.

Figure 1:
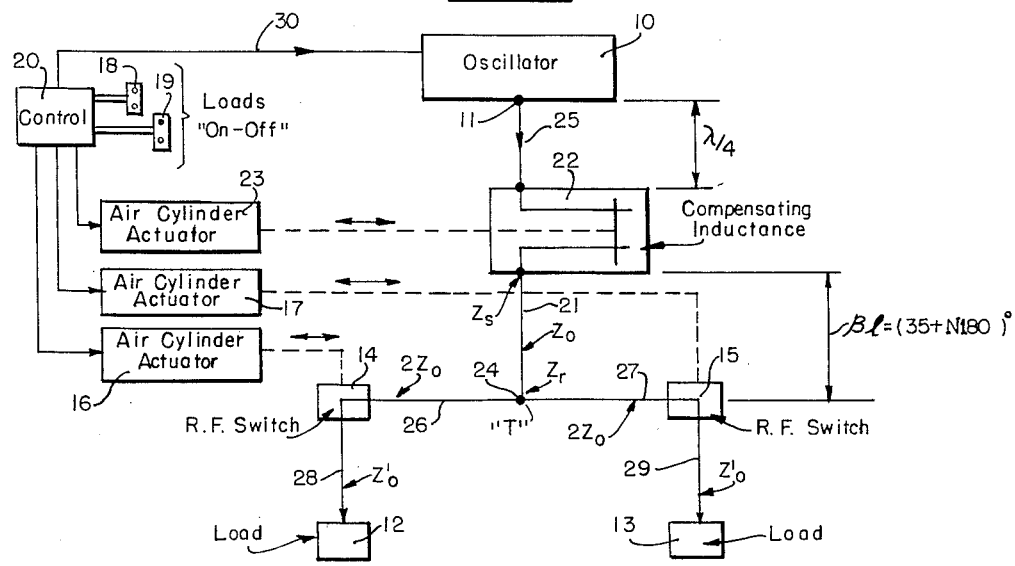
FIGURE 1 illustrates an improved transmission network constructed in accordance with the present invention.

Referring now to FIGURE 1, it will be seen that an improved transmission network adapted to heat a selected one, or both, of two loads may comprise an oscillator 10 having an output terminal 11 producing high frequency or RF oscillations adapted to energize a pair of loads 12 and 13. Which of said loads 12 and/or 13 is to be energized is determined by a pair of RF switches 14 and 15 associated with said loads respectively; and the switch state of these two switches 14 and 15 can in turn be controlled by a pair of independently operable air cylinders or pneumatic actuators 16 and 17 under the control of independent actuating switches 18 and 19 coupled to an electrical control network 20 of appropriate known configuration.

In operation, either, both, or neither of the loads 12 and 13 can be selected for energization by oscillator 10; and, as will be appreciated by those skilled in the art, the effective load impedance seen by oscillator 10 will normally change as the loading conditions of the overall system are changed, often with a highly undesirable result upon the operation of oscillator 10. In order to assure that the oscillator 10 sees an ideal load impedance under all possible conditions of operation, the said oscillator 10 may be coupled to the aforementioned loads 12 and 13 by a network comprising, inter alia, a single coaxial transmission line 21 having a predetermined carefully chosen electrical length $\beta l$ and having, for purposes of the subsequent discussion, a characteristic impedance $Zo$. This line may in turn be associated with a compensating inductance 22 having a reactive impedance variable between two preselected quantities by a further air cylinder or pneumatic actuator 23, under the control of the aforementioned control network 20.

Examining the circuit of FIGURE 1, it will be appreciated that if the transmission line 21 is terminated at a transmission "T" 24 (i.e. at $Zr$) by its characteristic impedance $Zo$, then the input impedance, $Zs$, of said line 21 will be a purely resistive impedance $Zo$, namely the characteristic impedance of the line, regardless of the electrical length of the line 21. On the other hand, however, if the line 21 should be terminated in an infinite impedance at $Zr$, or if it should be terminated in some other value of impedance, such as $2Zo$, then the effective impedance of the network as seen at $Zs$ will be entirely or in part reactive, and will vary in magnitude in accordance with the electrical length of line 21; and this variation in impedance under such other loading conditions will have an appreciable effect upon the operation of oscillator 10.

For purposes of the following discussion, that condition in which the line 21 is terminated in its characteristic impedance $Zo$ is not of immediate interest, inasmuch as such termination will produce a purely resistive impedance of known magnitude (i.e. $Zo$) at $Zs$ which will not have an adverse effect upon oscillator 10. If, however, the line 21 should be terminated at $Zr$ in an effective impedance $2Zo$, then it becomes important to so select the electrical length of line 21 that the resistive component of impedance of the overall network, as seen by oscillator 10 at $Zs$, becomes equal to the characteristic impedance $Zo$ of the line. This resistive component of impedance, moreover, will be connected in series with some known value of reflected reactive impedance which can be neutralized to assure that only a purely resistive impedance having a magnitude $Zo$ is seen by oscillator 10.

To determine just what electrical length ($\beta l$) of line 21 will produce this effect at point $Zs$ when said line 21 is terminated at point $Zr$ in an impedance of $2Zo$, the following analysis is presented. The generalized formula for determining the impedance $Zs$ when a line having a characteristic impedace $Zo$ is terminated by some impedance $Zr$, is as follows:

$$Zs = Zo \frac{Zr + jZo \tan \beta l}{Zo + jZr \tan \beta l} \qquad (1)$$

If $Zr$ is equal to $2Zo$, then, in accordance with the principles discussed above, we wish that $Zs$ equal $Zo + jXs$, where $Xs$ represents a reflected reactive component which may be eventually neutralized to present a purely resistive input to the oscillator. Substituting the value $2Zo$ for $Zr$ in Equation 1:

$$Zs = Zo \frac{2Zo + jZo \tan \beta l}{Zo + j2Zo \tan \beta l} = Zo \frac{2 + j \tan \beta l}{1 + j2 \tan \beta l} \qquad (2)$$

When $Zs$ equals $Zo + jXs$:

$$Zo + jXs = \frac{Zo(2 + j \tan \beta l)(1 - j2 \tan \beta l)}{1 + 4 \tan^2 \beta l} \qquad (3)$$

$$(Zo + jXs)(1 + 4 \tan^2 \beta l) = Zo(2 - j4 \tan \beta l + j \tan \beta l + 2 \tan^2 \beta l) = Zo(2 - j3 \tan \beta l + 2 \tan^2 \beta l)$$

Equating the reals, and recognizing $Zo$ to be a real number for RF transmission lines, we get:

$$Zo(1 + 4 \tan^2 \beta l) = Zo(2 + 2 \tan^2 \beta l)$$
$$1 + 4 \tan^2 \beta l = 2 + 2 \tan^2 \beta l$$
$$2 \tan^2 \beta l = 1$$
$$\tan \beta l = \pm 0.707 \qquad (4)$$

Utilizing only the positive root defined in Equation 4 we find:

$\beta l = 35°$, $215°$, etc., or $\beta l = (35 + N\ 180)°$, where $N = 0, 1, 2, 3$, etc. as permissible values for solutions to the problem.

As will be appreciated from the foregoing analysis, therefore, the line 21 should have an electrical length $\beta l$ equal to $(35 + N\ 180)$ degrees, where N is any positive integer including zero, in order to assure that the resistive component of impedance appearing at the input of the line is equal to $Zo$ regardless of whether the line is terminated in an impedance of $Zo$ or in an impedance equal to $2Zo$. In a practical embodiment of the invention wherein the loads 12 and 13 comprise dielectric heaters, the actual length of line selected was $215°$.

The question also arises as to just what the reactive component of impedance $Xs$ is, appearing at the input $Zs$ of line 21, when a line having the aforementioned electrical length of $(35 + N\ 180)$ degrees is terminated in either infinite impedance or in an impedance of $2Zo$. This component $Xs$ of reactive impedance may be determined from the following analysis: If $\beta l = 35°$, $215°$, etc. then, from Equation 2 supra, we find that $$Zs = Zo \frac{2Zo + jZo \times 0.707}{Zo + j2Zo \times 0.707}$$

$$Zs = Zo + jXs = Zo \frac{2 + j0.707}{1 + j1.414}$$

$$Zo + jXs = Zo \frac{2 + j0.707}{1 + j1.414} \times \frac{1 - j1.414}{1 - j1.414} = Zo \left[ \frac{3 - j2.121}{3} \right]$$

$$Z_o+jX_s=Z_o(1-j0.707)=Z_o-j0.707Z_o$$
$$X_s=-0.707Z_o \quad (5)$$

i.e. a capacitive reactance.

A similar analysis will establish that when the impedance presented at point $Z_r$ is infinite, $Z_s$ equals $-j1.414Z_o$, i.e. $Z_s$ equals $0-j1.414Z_o$ ohms, inasmuch as the resistive component of impedance at $Z_s$ is equal to essentially zero for any unterminated efficient line.

As will be appreciated from the foregoing, the value of reactive impedance appearing at the input of line 21 is equal to a capacitive reactance of $0.707Z_o$ ohms whenever line 21 is terminated in an impedance of $2Z_o$ resistive ohms. In order to assure that a purely resistive impedance $Z_o$ is therefore presented to the oscillator 10 whenever line 21 is terminated into a single load, means should be provided to place an inductive impedance having an electrical value of $+j0.707Z_o$ ohms in series with the input of transmission line 21; and the compensating inductance 22, under the control of air cylinder or pneumatic actuator 23, functions to effect this latter compensation.

Examining the circuit of FIGURE 1 in some detail now, it will be seen that the oscillator 10 is coupled to the compensating inductance 22 by means of a quarter-wave matching section 25, the function of which will be described in greater detail subsequently. The output of matching section 25 passes through compensating inductance 22 which may, under the control of actuator 23, assume a reactance value of either zero ohms or $+j0.707Z_o$ ohms; and the output of the said compensating inductance 22 is thereafter applied to the input, $Z_s$, of the transmission line 21 having the aforementioned length $\beta l$ of $(35+N\,180)$ degrees. The output of transmission line 21 is coupled to the input of a "T" 24, and the output arms of said "T" 24 are coupled via matched connecting sections 26 and 27, each of which comprises a transmission line having a characteristic impedance $2Z_o$, to the input of RF switches 14 and 15. The outputs of said switches 14 and 15 are thereafter coupled via further connecting sections 28 and 29, each of which may have a characteristic impedance $Z_o'$, to the aforementioned loads 12 and 13. The particular value of $Z_o'$ chosen will depend on the electrical nature of the loads 12, 13 and lengths of lines 28, 29; and must finally be so chosen in order to effect an overall impedance transformation to a value $2Z_o$ as seen at the respective input terminals of switches 14 and 15.

In operation, the loads 12 and 13 can be switched into or out of the circuit under the control of air cylinder or pneumatic actuators 16 and 17. Three conditions of operation exist, these being respectively, no-load, single load (i.e. either load) and dual load operation.

Examining these conditions of operation individually, it should first be noted that with both loads 12 and 13 out of the circuit, the loads 12 and 13 and their associated switches and matched connecting sections each reflect substantially infinite impedance to the "T" 24. This infinite impedance presented at point $Z_r$ of the 215° line 21 is transformed to a value of $-j1.414Z_o$ at the point $Z_s$, comprising the input to line 21. For this no-load condition of operation, the oscillator 10 is, as will be described, effectively deenergized by control circuit 20 whereby the actual impedances seen by the oscillator output are of no concern. However, the overall feeding network nevertheless assures that, even under such deenergized conditions, the oscillator is still presented with a proper load (i.e. substantially infinite load) whereby the system has an inherent safety feature.

Thus, the control system 20 and air cylinder or pneumatic actuator 23 are so constructed and arranged that the compensating inductance is in the circuit under no-load conditions, thereby presenting an inductive impedance of $+j0.707Z_o$ in series with the aforementioned capacitive impedance $-j1.414Z_o$. As a result, the total impedance presented at the output of the quarter-wave matching section 25 is $-j0.707Z_o$ ohms.

In accordance with known electrical theory, the quarter-wave section 25 transforms this termination into an impedance of value $$+j\frac{Z_o^2\lambda}{0.707Z_o}$$

where $Z_o\lambda$ is the characteristic impedance of the line 25. The output terminal 11 of oscillator 10 will be presented with a relatively high (for practical purposes essentially infinite) impedance of $Z_o\lambda$ is subsantially larger than $Z_o$. This condition can always be assumed under any practical conditions of operation by selecting appropriate lines having the desired comparative characteristic impedances. In an actual embodiment of this invention the lines 21 and 25 were so selected that $Z_o\lambda=100$ ohms and $Z_o=65$ ohms, whereby an input impedance of $+j218$ ohms is seen at the input terminals 11 of the line 25. This 218 ohm inductive reactance may essentially be considered infinite since it spans in parallel to ground a 7.3 ohm section of the tank coil in oscillator 10. This low value of reactance (7.3 ohms) renders negligible the 218 ohm inductive reactance connected in parallel. Since the total tank inductive reactance of the oscillator is less than 29 ohms, the only effect which the 218 ohm reactance (occasioned by an open circuit at the "T" point 24) will have is a frequency rise of considerably less than one half of one percent. Accordingly, although its application is not particularly used nor relied upon in practice (since the oscillator is actually deenergized under no-load conditions), a high inductive impedance nevertheless appears at the oscillator output; and this property of the invention may be viewed as a safety feature, in that under fully deenergized load conditions the oscillator is presented with an essentially infinite load impedance, containing no resistive component, which non-resistive load is, of course, the proper load impedance for the oscillator to effect zero power transfer.

With both loads 12 and 13 in the circuit, each load reflects an effective impedance of $2Z_o$ to the "T" 24. Inasmuch as these two effective impedances are in parallel with one another, the resultant impedance seen by line 21 at the point $Z_r$ is $Z_o$, namely, the characteristic impedance of the line; and as a result, the effective impedance at the input of the line, point $Z_s$, is also the characteristic impedance of the line, namely $Z_o$. Under this fully energized condition of operation, therefore, no inductive compensation is necessary and the air cylinder 23 is caused to so vary the value of inductance 22 that it presents a zero magnitude of inductance. The quarter-wave section 25 is therefore resistively terminated in an impedance $Z_o$, the characteristic impedance of line 21; and under this dual load condition of operation, the quarterwave section merely converts the impedance $Z_o$ to some other value of resistive impedance which may be more easily usable by the oscillator 10. In one actual embodiment of the invention, the characteristic impedance of the line $Z_o$ is, as mentioned previously, 65 ohms; and under fully loaded conditions the quarterwave section 25 serves to convert the oscillator loading from $65+j0$ ohms at the output of line 25 to the more easily usable value of $154+j0$ ohms at the terminal 11 of oscillator 10.

When only one of the two loads 12 and 13 is switched into the circuit, the single load being energized reflects an impedance of $2Z_o$ to the "T" 24. The line 21, having a length $(35+N\,180)$ degrees, transforms this terminating impedance, as was developed in the preceding analyses, to a value of $Z_o-j0.707Z_o$ at the input point $Z_s$ of the said line. Under this condition of operation, the control network 20 and actuator 23 operate to cause the compensating inductance 22 to present a magnitude of $+j0.707Z_o$ in series with the network whereby the effective impedance seen at the output end of matching section 25 is again purely resistive and has a magnitude Zo. As was the case in the instance discussed previously, matching section 25 serves to convert this value of resistive impedance to a value more easily usable by the oscillator 10.

The actuators 16, 17 and 23 are automatically controlled by control network 20 whereby the actuation of the appropriate switches 18 and 19 assures selection of which loads 12 and 13 are to be energized, and simultaneously moves the compensating inductance 22 to a proper position assuring that the proper load is presented to oscillator 10 under the selected loading conditions. A further control is effected by control network 20, however; and in particular, the said network responds to the load selection in such a manner that the output power level of oscillator 10 assumes the proper value of power for the actually selected loading conditions. This control is effected via a line 30 coupled to a network in oscillator 10 controlling the plate voltage of said oscillator. In particular, full power output is achieved by oscillator 10 when both loads 12 and 13 are selected for energization. When only one load 12 or 13 is selected for energization, the plate voltage of oscillator 10 is reduced to 0.707 of its full voltage whereby the output power level of oscillator 10 drops to one-half its full power output. In the event that both loads 12 and 13 are to be de-energized, the plate voltage of oscillator 10 is reduced to zero whereby, as mentioned previously, the oscillator power output is reduced to zero under such no-load operating conditions.

It will be appreciated therefore that the overall arrangement of FIGURE 1 is such that the proper load impedance is presented to oscillator 10 under all possible loading conditions; and that the oscillator 10 in turn produces the proper output power level as required by the load selection. The independent selection of the plural loads involved, automatically effects the various controls to assure this proper loading and output power level of the oscillator.

Figure 2:
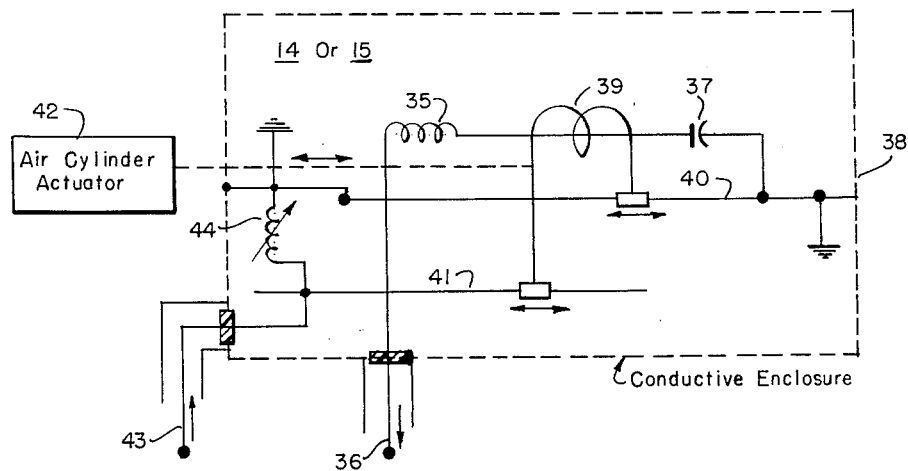
FIGURE 2 is a schematic diagram of an improved RF switch, such as may be employed in the arrangement of FIGURE 1.

The RF switches 14 and 15 discussed in reference to FIGURE 1 may take various configurations known to those skilled in the art. FIGURE 2, however, illustrates schematically one form of switch which has been found to operate most satisfactorily in the circuit of FIGURE 1. This particular switch utilizes a fixed coil 35 having one end thereof coupled to a coaxial output line providing an output point 36 (e.g. the input to line section 28 or 29 of FIGURE 1), and having the other end thereof coupled via a capacitor 37 to a point of ground potential such as a grounded conductive enclosure 38. The switch further includes a movable coil 39 having the ends thereof slidably disposed on a pair of copper rails 40 and 41, and the actual position of coil 39 is determined by an air cylinder actuator 42 which corresponds to the actuators such as 16 and 17 already discussed in reference to FIGURE 1.

The rail 40 is connected at each end to a point of ground potential, e.g. to the aforementioned enclosure 38 whereby the end of movable coil 39 coupled thereto is maintained at ground potential. The rail 41 is coupled to a coaxial input line providing an input point 43 (e.g. connected to the output of matching section 26 or 27, already described in reference to FIGURE 1) whereby energy is transferred from input point 43 through rail 41 to movable coil 39. The actual voltage which therefore appears across fixed coil 35 and at output point 36 depends upon the position of coil 39 relative to coil 35; and desired switching properties are obtained through a relatively wide variation of mutual inductance between coils 35 and 39 created by a relatively long motion (e.g. a 15-inch stroke) of the air cylinder 42.

The capacitor 37, mentioned previously, may take the form of a vacuum capacitor, and serves to neutralize most of the secondary inductive reactance of the fixed coil 35 so that the output energy appearing at output terminal 36 is available from a reasonable source impedance. In addition, an electrically isolated adjustable inductance 44 is provided between the hot rail 41 and the grounded enclosure 38 to assure that when the switch of FIGURE 2, for example, is to be employed in an arrangement such as that already described in reference to FIGURE 1, an infinite impedance is presented at the "T" 24 when the air cylinder actuator 42 is fully retracted to de-energize a load coupled to output point 36.

In actual practice, when a switch such as that described in reference to FIGURE 2 is employed in the arrangement of FIGURE 1, the overall resulting circuit can be empirically set up to accurately exhibit the desirable properties of the transmission network already discussed. In order to set up each side of the load cricuit, the matched connecting sections 26 and 27 can be individually broken adjacent their points of junction with the "T" 24, and a Q-meter inserted in the broken place. By way of example, to set up load 12, the line 26 is broken to the left of "T" 24, a Q-meter is inserted in the break, and the load 12 is initially de-coupled from the circuit by full retraction of the air cylinder actuator 16 (or 42). For this de-coupled condition of load 12, the load and its associated connecting lines should, of course, reflect an infinite impedance at the "T" 24, and the inductance 44 (see FIGURE 2) may be adjusted under this de-coupled load condition until such an infinite impedance is in fact presented, as indicated on the aforementioned Q-meter.

The load 12 is then inserted in the circuit by fully advancing the air cylinder actuator 16 (or 42), whereafter the load itself is tuned until the Q-meter shows that the load 12 and its associated matching sections 26 and 28 present the desired impedance of 2Zo at the "T" junction 24. A similar balancing arrangement can thereafter be effected with respect to the load 13, whereby the circuit can be finally set up to assure that oscillator 10 will see essentially infinite impedance under no-load conditions, and will see a desired predetermined value of resistive impedance under single or dual-load operating conditions.

Figure 3:
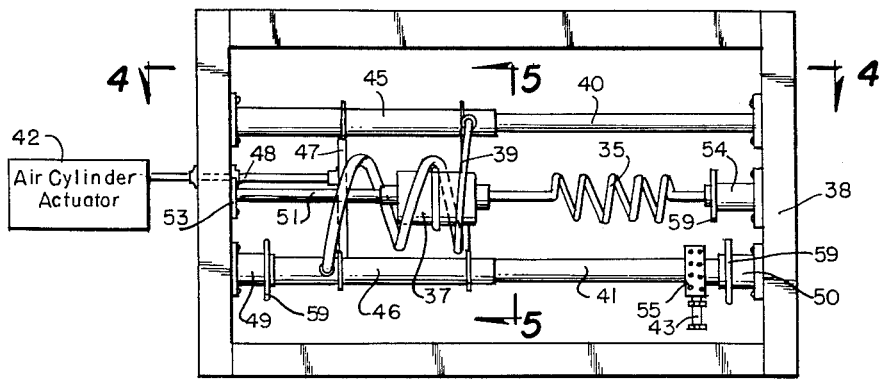
FIGURE 3 is a plan view of an RF switch structure constructed in accordance with the circuit of FIGURE 2.
Figure 4:
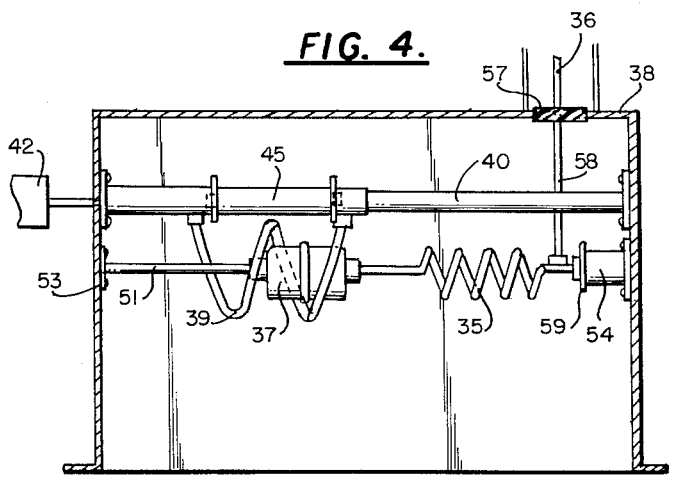
FIGURE 4 is a view taken on line 4—4 of FIGURE 3.
Figure 5:
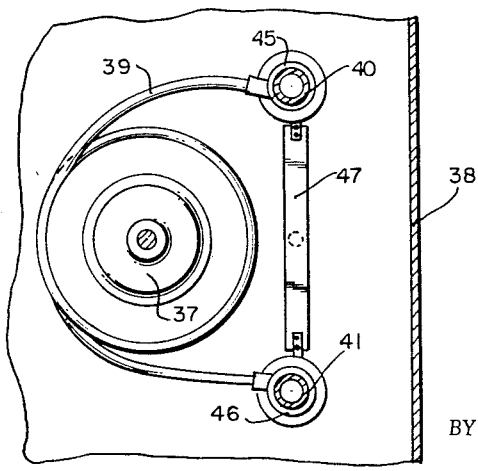
FIGURE 5 is a view taken on line 5—5 of FIGURE 3.

An actual physical embodiment of switch structure constructed in accordance with the circuit of FIGURE 2 has been shown in FIGURES 3 through 5, and the various components comprising a physical embodiment of the electrical portions already discussed in reference to FIGURE 2 have been represented by like numerals in FIGURES 3 through 5. The copper rails 40 and 41 carry slidable sleeves 45 and 46, respectively, for supporting the movable coil 39 as shown, and these sleeves 45 and 46 are preferably interconnected by a Teflon spacer 47 which can in turn be mechanically connected to a rod 48 passing through the conductive housing 38 to the air cylinder actuator 42 whereby said actuator 42 may advance or retract coil 39 as may be selected.

The rail 40 is, as indicated in FIGURES 3 and 4, connected to conductive housing 38 which is in turn grounded. The rail 41, however, is connected to housing 38 by means of Teflon bushings 49 and 50 which permit said rail 41 to float electrically, as shown in FIGURE 2. The fixed coil 35 and vacuum capacitor 37 can be connected in colinear relation with one another, as illustrated in FIGURES 3 and 4; and these series connected components may in turn be supported within housing 38 by means of a conductive rod 51 and supporting insulator 54, which may take the form of a Teflon bushing. The actual position of fixed coil 35 and vacuum capacitor 37 is such that coil 39 may move in substantially coaxial relation thereto.

One end of the series connected arrangement of capacitor 37 and coil 35 is electrically connected to conductive housing 38 at a point 53 via the aforementioned rod 51, whereby it is grounded; and the other end of said series connected arrangement, supported by means of Teflon bushing 54, is electrically free of the conductive housing. The input 43 of the switch is provided at a conductive junction block 55 electrically connected to the conductive rail 41; and the output 36 of the switch may be taken from a coaxial line having its inner conductor connected via a Teflon insert 57 to a conductive rod 58 electrically connected to one end of coil 35 as illustrated. Corona rings 59 can be disposed as shown in the various portions of the overall arrangement.

In the actual operation of the overall circuit shown in FIGURE 1, having switches such as those discussed in respect to FIGURES 2–5 incorporated therein, all of the high frequency circuits are preferably automatically de-energized at the oscillator 10, again under the control of circuit 20, during the interval required for coil 39 to traverse its 15-inch displacement. This precautionary measure eliminates sparking between sliding contacts 45, 46 and 40, 41, as compared with the condition that would be met if the switching circuits were maintained energized during actual motion of coil 39. This sparking phenomenon, moreover, is not unique to the arrangements of power switches 14 and 15 but will occur in any energized RF circuit wherein motion is imparted to sliding contacts no matter how large or well fitted (within practical limitations) the sliding surfaces may be. The rate of travel of actuators 16, 17 (or 42) is adjustable and the completion of the 15-inch stroke within one to two seconds was found to yield satisfactory overall operation. Accordingly, the oscillator 10 will deliver power as soon as the switches have assumed steady positions at either end of their travel; and the power so delivered will be at a power level determined by the final positions of the two switches following a switching operation. This arrangement not only eliminates contact sparking, already discussed, but also assures that the oscillator, at all times of energization, sees the ideal impedances discussed previously. These ideal impedance values are realized only whenever each of the two switches, independent of each other, is advanced or retracted to either of its final positions. Thus, odd impedances which do not match the oscillator, and which are incurred only during the one to two second travel times of either switch, are rendered harmless by de-energization of the oscillator during such a transient period.

While I have thus described a preferred embodiment of the present invention, many variations will be suggested to those skilled in the art. It must therefore be emphasized that the foregoing description is meant to be illustrative only and should not be considered limitative of my invention; and all such variations and modifications as are in accord with the principles described are meant to fall within the scope of the appended claims.

Having thus described my invention, I claim:

1. In combination, an electrical junction, a pair of loads coupled in parallel via switch means to said junction, said loads being so selected that they present a parallel impedance of $Z_o$ ohms at said junction when both loads are connected thereto, present a substantially infinite impedance at said junction when both loads are disconnected therefrom, and present an impedance of $2Z_o$ ohms at said junction when one only of said loads is connected thereto, a source of RF energy, means for coupling said source to said junction comprising a transmission line having a characteristic impedance $Z_o$ and an electrical length of substantially $(35+N\,180)$ degrees, where N is an integer equal to or greater than 0, a compensating inductance having a reactive impedance of substantially $0.707Z_o$, and control means for connecting said inductance between said source and said line when a single one of said loads is connected to said junction, and for disconnecting said inductance from between said source and said line when both of said loads are connected to said junction, whereby a predetermined fixed value of resistive impedance is presented to the output of said source when either one or both of said loads are coupled to said junction.

2. The combination of claim 1 wherein said inductance is coupled to said source via a quarter-wave transmission section, said control means being operative to connect said inductance to said quarter-wave section when both said loads are disconnected from said junction whereby said source sees substantially infinite impedance when both said loads are disconnected from said junction.

3. The combination of claim 1 wherein said source is operative to produce a predetermined power output when both said loads are connected to said junction, and means for halving the power output of said source when a single one of said loads is connected to said junction.

4. In combination, a pair of switching elements, each of said switching elements comprising a pair of coils movable relative to one another between closely coupled and substantially decoupled positions, a pair of dielectric heaters each of which comprises electrode means for applying energy to a dielectric load, means coupling each of said electrode means to one of said pair of coils respectively, means coupling energy to the other coils of said pair of switching elements comprising an elongated transmission line coupled at one of its ends to both said other coils, a variable reactance series connected to the other end of said transmission line, an oscillator coupled to said other end of said transmission line via said series connected variable reactance, and control means for varying the relative positions of said pairs of coils, said control means including means for causing said variable reactance to exhibit a first magnitude of impedance when the pair of coils in both said switching elements are in their closely coupled positions, and for causing said variable impedance to exhibit a second magnitude of impedance when the pair of coils in either or both of said switching elements are in their substantially decoupled positions, thereby to selectively energize one, both, or neither of said dielectric loads from the same said oscillator over the same said transmission line while simultaneously assuring that said oscillator sees substantially ideal load impedances under all said conditions of operation.

5. In combination, a plurality of loads, a single oscillator for selectively energizing said loads, means for transferring energy from said oscillator to said loads including an elongated coaxial transmission line having one end thereof coupled to said oscillator, switch means at the other end of said transmission line for selectively coupling none, some, or all of said loads to said other end of and means for maintaining the effective load impedance seen by said oscillator within desired limits with changes in the number of loads which are coupled by said switch means to said other end of said transmission line, said maintaining means comprising reactive impedance means disposed adjacent to and in series with said one end of said line for at least partially cancelling reactive ohms reflected back toward said oscillator when one only or none of said loads is coupled to said other end of said line whereby a substantially purely resistive impedance is presented to said oscillator under all conditions of load operation, and control means for selectively connecting and disconnecting said reactive impedance means to and from said one end of said line with changes in the number of said loads being energized from said oscillator over said line.

6. In combination, a source of high frequency energy, a pair of loads, a single elongated transmission line adapted to transfer energy between said source and said loads, variable reactive impedance means coupling one end of said line to the output of said source, a pair of switching means for coupling the other end of said line to both, either one, or neither of said pair of loads respectively, a pair of independently operable first actuating means coupled to said pair of switching means respectively for independently controlling the energy coupling states of said switching means thereby to control the number and selection of said loads which are energized from said source via said single transmission line, second actuating means coupled to said variable reactive impedance means, and control means coupled to said plurality of first actuating means as well as to said second actuating means for automatically varying the effective impedance of said reactive impedance means with preselected changes in the energy coupling states of said plurality of switching means, said control means being operative to cause said variable reactive impedance means to exhibit a first magnitude of impedance when both said loads are coupled to said other end of said line, and being operative to cause said variable reactive impedance means to exhibit a second different magnitude of impedance when one only or neither of said loads is coupled to said other end of said line.

7. The combination of claim 6 wherein said control means includes means coupled to said source for automatically changing the power output level of said source concurrent with preselected changes in the energy coupling states of said plurality of switching means.

8. The combination of claim 6 wherein each of said switching means is switchable between substantially full coupling and full decoupling positions, said control means including means coupled to said source for preventing transfer of energy from said source to said line during transition of any said switching means between its said positions.

9. In combination, a pair of loads, a pair of independently operable switching elements for coupling both, either or neither of said loads to a common electrical junction, each of said loads and its associated switching element being pretuned so as to present, together, substantially infinite impedance at said junction when said associated switching element is open, each of said pretuned loads and associated switching elements being pretuned to present a predetermined finite impedance at said junction when said associated switching element is closed, a source of RF energy, a transmission line interposed between said source and said junction, and means for maintaining an impedance match between said source and the network comprising said transmission line, said switching elements and said loads connected to said source, said last-named means comprising a variable reactance series connected between said transmission line and said source, actuator means for varying the magnitude of said variable reactance between first and second predetermined values, and control means responsive to predetermined changes in the relative energy coupling states of said pair of switching elements for automatically operating said actuator means to change the magnitude of said series connected variable reactance thereby to maintain said impedance match with changes in the number of loads energized by said source.

10. In combination, a source of high frequency energy of substantially fixed frequency, a pair of loads, network means for coupling energy at said substantially fixed frequency from said source to said loads, said network means including a pair of independently operable switching means interposed respectively between said pair of loads and said source and adapted to be independently changed between coupled and decoupled switch states whereby both, either one, or neither of said loads may be energized at said substantially fixed frequency from said source by corresponding changes in the coupled and decoupled switch states of said independently operable switching means, and means for maintaining the impedance seen by said source within predetermined limits notwithstanding changes in the number of loads energized from said source thereby to inhibit frequency variation of said source due to changes in the number of loads being energized, said impedance maintaining means comprising a variable reactance series connected between said source and said switching means as a portion of said network means, and control means responsive to the relative switch states of said pair of switching means and including means automatically operable to cause said variable reactance to exhibit a predetermined magnitude of impedance when both said loads are being energized from said source, and automatically operable to cause said variable impedance to exhibit a different magnitude of impedance when one only or neither of said loads is being energized from said source.

11. The combination of claim 10 wherein each of said loads comprises a dielectric heater.

12. The combination of claim 10 wherein said control means includes further means responsive to the relative switch states of said pair of switching means for automatically varying the power output level of said source with variations in the number of loads being energized.

References Cited in the file of this patent

UNITED STATES PATENTS

| | | |
|---|---|---|
| 1,909,610 | Carter | May 16, 1933 |
| 2,011,943 | Lindenblad | Aug. 20, 1935 |
| 2,109,465 | Carter | Mar. 1, 1938 |
| 2,163,750 | D'Heedene | June 27, 1939 |
| 2,213,054 | Schussler | Aug. 27, 1940 |
| 2,453,529 | Mittelmann | Nov. 9, 1948 |
| 2,644,926 | Varela | July 7, 1953 |